United States Patent Office 3,395,770
Patented Aug. 6, 1968

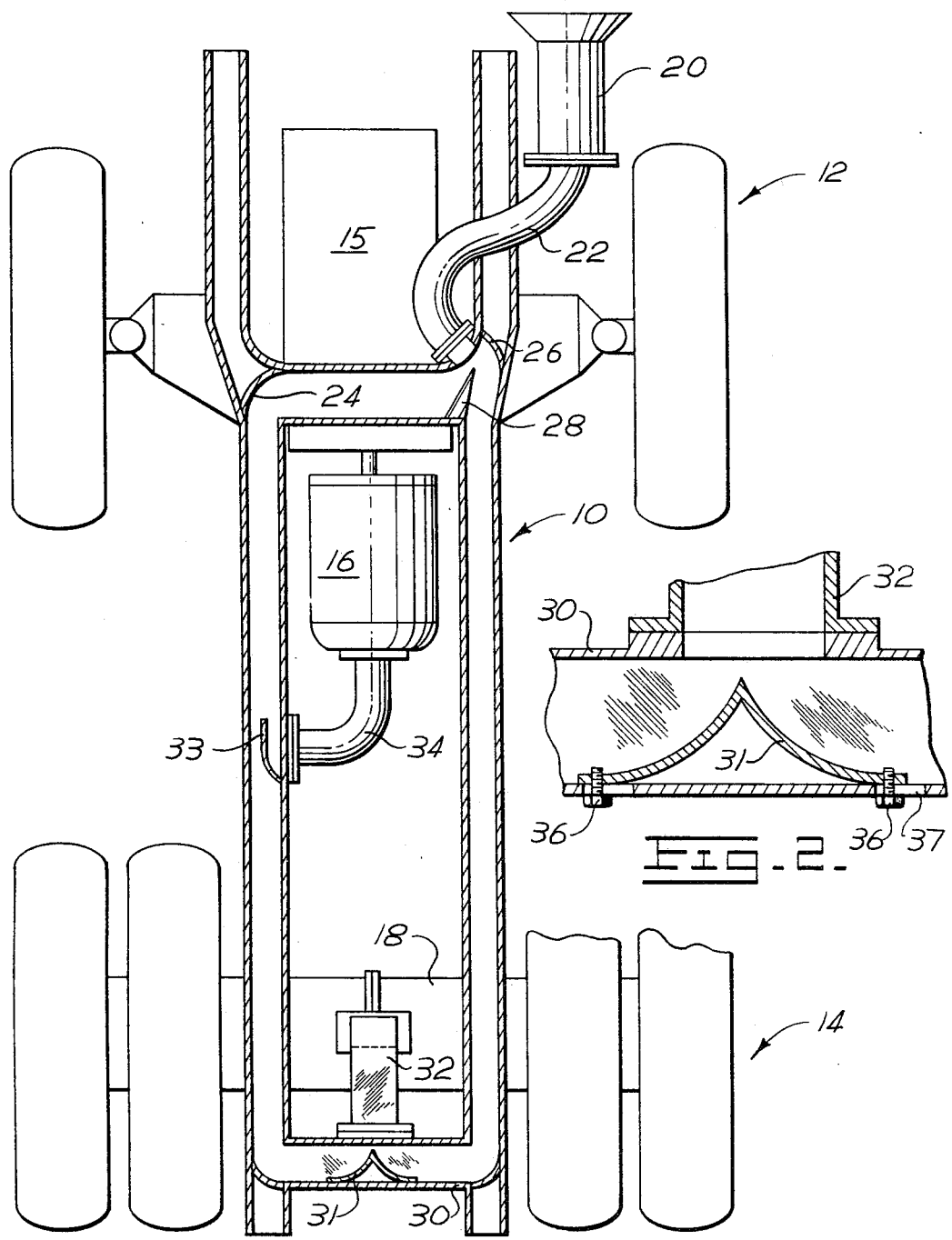

3,395,770
COOLING MEANS FOR VEHICLE ELECTRIC
DRIVE COMPONENTS
John H. Babbitt, Jr., Peoria, Ill., assignor to Caterpillar
Tractor Co., Peoria, Ill., a corporation of California
Filed Oct. 3, 1966, Ser. No. 583,853
1 Claim. (Cl. 180—65)

ABSTRACT OF THE DISCLOSURE

Means to cool the generator and motors in an electric drive vehicle and particularly means for directing large quantities of ambient air into contact with such components to reduced the heat which results from their operation.

---

This invention relates to cooling of the generator and motors in an electric drive vehicle and particularly to means for directing large quantities of ambient air into contact with such components to reduce the heat which results from their operation.

It is the object of the invention to provide cooling air conducting means for a vehicle which utilizes hollow structural members of the vehicle to good advantage and insures adequate cooling of each of several components.

Further and more specific objects and advantages of the invention and the manner in which it is carried into practice are made apparent in the following specification wherein reference is made to the accompanying drawing.

In the drawing:

FIG. 1 is a schematic plan view of a vehicle frame and running gear with electric drive means and cooling means embodying the present invention; and FIG. 2 is an enlarged detail of a part of the construction illustrated in FIG. 1.

The frame of a vehicle is generally indicated at 10 in FIG. 1 as constructed of hollow components and illustrated in section. Front wheels, generally indicated at 12 and rear wheels at 14 support the frame in a conventional manner and the vehicle is powered by an engine 15 such as a conventional internal combustion engine which drives a generator 16 connected by suitable conductors to two motors (not shown) but disposed within a large wheel supporting housing 18 extending between the rear wheels. Each of these motors is connected in driving relationship with the rear wheels on one side of the vehicle.

Air for cooling the generator 16 and motors within the housing 18 is picked up by a blower 20 disposed forwardly of the vehicle and which may be driven either electrically or by a power takeoff from the engine 15. Air under pressure from the blower is directed through a tube 22 into the hollow frame which is closed forwardly by partitions 24 and 26 to insure that the cooling air is directed rearwardly of the frame. The air is divided between the two side components of the frame by a dividing plate or baffle 28 intercepting the air issuing from the tube 22. The air travels rearwardly through both main side members of the frame and enters a central rear cross member 30 where it is directed forwardly by curved baffles 31. Here it enters a conduit 32 which directs it downwardly where it passes outwardly in opposite directions and between the rotor and stator of the driving motors.

A portion of the air passing rearwardly through one of the main side frames herein shown as the left frame is diverted by a baffle 33 into a conduit 34 and thence forwardly through the generator 16 passing outwardly for discharge into the atmosphere at the forward end of the generator.

Since the baffles 28 and 33 may not result in an equal flow of air rearwardly through the side sections of the frame 10, the baffle 31 may, if desired, be made adjustable as shown in FIG. 2 by being secured in place by cap screws 36 extending through slots 37 in frame part 30 so that the curved baffles 31 may be moved from side to side to proportion the amount of air directed to the generator and to the drive motors in housing 18 as required for most efficient utilization of the available air volume.

The schematically illustrated truck frame of FIG. 1 is based upon the arrangement of a seventy-five ton off-highway type truck. A similar truck of one hundred ton capacity utilizes an additional pair of wheels disposed rearwardly of the dual drive wheels and the present invention is of course readily adaptable to this and other variations in truck design.

I claim:
1. In an electric drive vehicle having a hollow frame component, a generator between two elements of said frame components, a drive wheel supporting housing having electric motors therein, an air blower, means for directing air from the blower through the frame component to the generator and the motors, said air being introduced to the forward end of the frame component and flowing rearwardly through said two elements and being introduced centrally of the wheel supporting housing to flow outwardly in both directions to the motors therein and adjustable baffle means for varying the proportionate volume of air directed to the generator and to the motors.

References Cited

UNITED STATES PATENTS

| | | | |
|---|---|---|---|
| 887,483 | 5/1908 | Ledwinka. | |
| 1,746,181 | 2/1930 | Baldwin | 180—1 |
| 1,858,506 | 5/1932 | Jacobs | 180—65 |
| 3,035,652 | 5/1962 | McLean | 180—60 XR |

BENJAMIN HERSH, Primary Examiner.
MILTON L. SMITH, Assistant Examiner.